United States Patent [19]

Abell

[11] 4,132,374
[45] Jan. 2, 1979

[54] WING PIVOT LOCATION AND STRUCTURE FOR OBLIQUE WING AIRPLANE

[75] Inventor: Clarence L. Abell, Seattle, Wash.

[73] Assignee: The Boeing Company, Seattle, Wash.

[21] Appl. No.: 755,833

[22] Filed: Dec. 30, 1976

[51] Int. Cl.² .............................................. B64C 3/40
[52] U.S. Cl. .................................................... 244/46
[58] Field of Search ................................ 244/45 R, 46

[56] References Cited

U.S. PATENT DOCUMENTS

| 3,206,146 | 9/1965 | Toms | 244/46 |
| 3,212,732 | 10/1965 | Scerbo et al. | 244/46 |
| 3,258,228 | 6/1966 | Crook | 244/46 |
| 3,606,978 | 9/1971 | Whitener | 244/46 |
| 3,971,535 | 7/1976 | Jones | 244/46 |

Primary Examiner—Trygve M. Blix
Assistant Examiner—Charles E. Frankfort
Attorney, Agent, or Firm—Christensen, O'Connor, Johnson & Kindness

[57] ABSTRACT

A supersonic airplane having a wing mounted for pivotal movement between a conventional position orthogonal to the fuselage and an oblique position relative to the fuselage has its vertical pivot axis offset from the mean aerodynamic center of lift of the wing when the wing is in the conventional position. The pivot axis can, for example, be offset rearwardly from the mean aerodynamic center of lift and transversely relative to the fuselage in the direction of the trailing tip of the wing when in an oblique position to counteract pitch and roll moments induced by the aeroelastic effect on the wing and by the center of pressure shift occurring at supersonic flight speeds.

7 Claims, 5 Drawing Figures

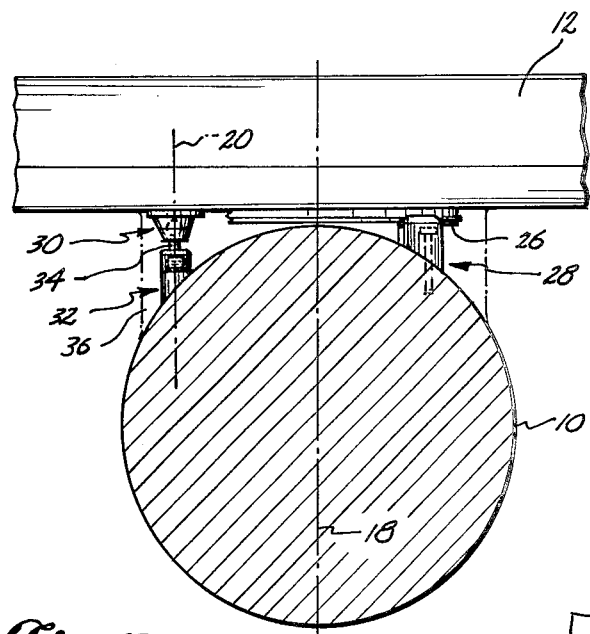
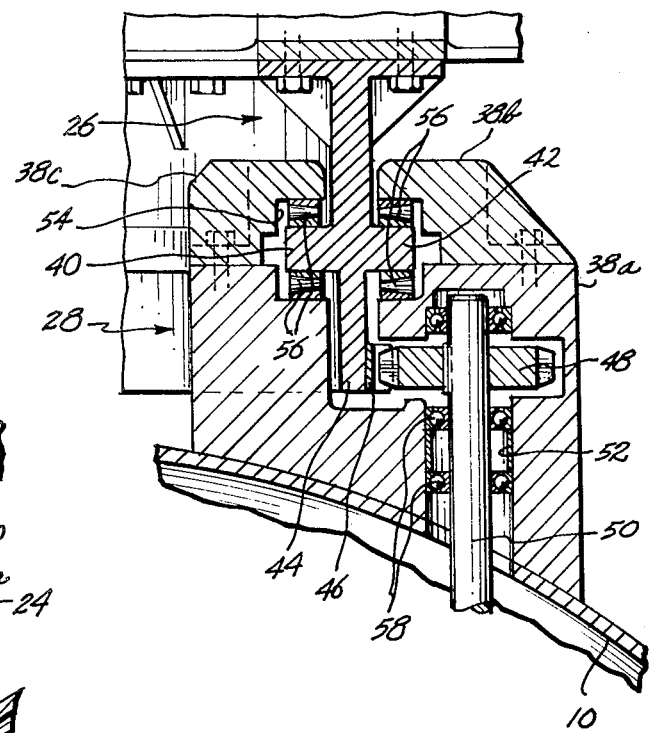
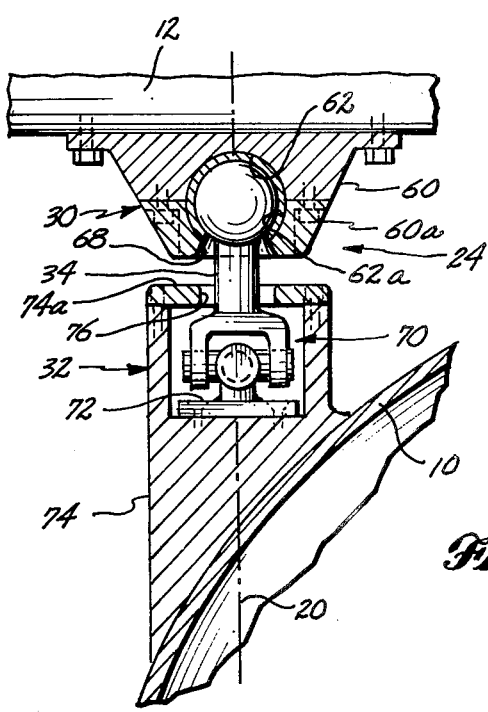

WING PIVOT LOCATION AND STRUCTURE FOR OBLIQUE WING AIRPLANE

BACKGROUND OF THE INVENTION

The present invention relates to supersonic airplanes, particularly to a supersonic airplane having a wing swingable from a conventional position orthogonal to the fuselage for subsonic flight and an oblique position relative to the fuselage for supersonic flight, and more particularly to the wing pivot location and wing pivot structure for such an airplane.

Certain aerodynamic characteristics of an oblique wing transonic airplane are discussed in two articles: "Transonic Transport Wings — Oblique or Swept?", Jones, R. T. and Nisbet, J. W., *Astronautics and Aeronautics,* January, 1974, pages 40–47; and, "Aeroelastic Stability and Control of an Oblique Wing," Jones, R. T. and Nisbet, J.W., *Aeronautical Journal,* August, 1976, pages 365–369, both of which are expressly incorporated herein by reference. A phenomenon discussed in the aforementioned articles relates to the aeroelastic effect produced by an oblique wing airplane at supersonic flight speeds. Simply, the aeroelastic effect tends to cause the leading tip of an oblique wing to distort or bend upwardly, thereby increasing the angle of attack of that wing relative to the fuselage orientation. The aeroelastic effect on the oblique wing, which increases with increasing dynamic pressure, will induce both a pitch and a roll moment on the airplane. The pitch moment will tend to cause the nose of the fuselage to raise while the roll moment will cause the airplane to roll in the direction of the trailing tip of the oblique wing. One suggestion noted in the articles for counteracting the roll moment induced by the aeroelastic effect is to trim the airplane for level flight using control surfaces such as ailerons on the wing to counteract both the pitch and roll moments. However, trimming with the ailerons decreases the lift to drag ratio, and thus detracts from one of the primary advantages of the oblique wing over other transonic and supersonic airplane wing designs (such as swept wings, variable sweep wings and delta wings), namely a high lift to drag ratio.

Another aerodynamic phenomenon that occurs when an airplane is flown at supersonic speeds is that the center of pressure on the wing shifts aft from its location at subsonic flight speeds. The shift in the center of pressure will induce a downward pitch moment on the airplane. This downward pitch moment is usually counteracted by a combination of aircraft design techniques and by properly trimming the aircraft with pitch control surfaces, the latter of which, again, causes an undesirable reduction of the lift to drag ratio of the airplane.

It is a broad object of the present invention to provide an improvement in an oblique wing airplane to counteract the induced roll and pitch caused by the aeroelastic effect and the center of pressure shift just discussed. It is an additional object of the present invention to provide an improved and novel structure for interconnecting the wing and fuselage of an oblique wing airplane. Further objects of the present invention are to provide such an improved structure that is of relatively simple construction, and that will not affect adversely flight characteristics when the oblique wing is swung to a conventional configuration.

SUMMARY OF THE INVENTION

In accordance with the foregoing objects, and other objects that will become apparent to one of ordinary skill in the art, the present invention provides an improvement for mounting a swingable oblique wing on an airplane fuselage comprising means for coupling the wing to the fuselage for swinging movement between a conventional position and an oblique position about a substantially vertical axis that is offset from the mean aerodynamic center of lift of the airplane wing.

BRIEF DESCRIPTION OF THE DRAWINGS

A better understanding of the present invention can be derived by reading the ensuing specification in conjunction with the accompanying drawings wherein:

FIG. 3 is a simplified cross-sectional view looking forwardly on a fuselage segment and wing pivot assembly similar to that shown in FIG. 2 with the wing positioned in its orthogonal position relative to the fuselage;

FIG. 4 is a greatly enlarged, simplified, cross-sectional view of a circular track and guide member forming a portion of the means for coupling the wing to the fuselage taken substantially along section line 4—4 of FIG. 2; and FIG. 5 is a greatly enlarged, simplified, cross-sectional view of a wing pivot joint forming part of the present invention taken substantially along section line 5—5 of FIG. 2.

DETAILED DESCRIPTION

Figure 1:
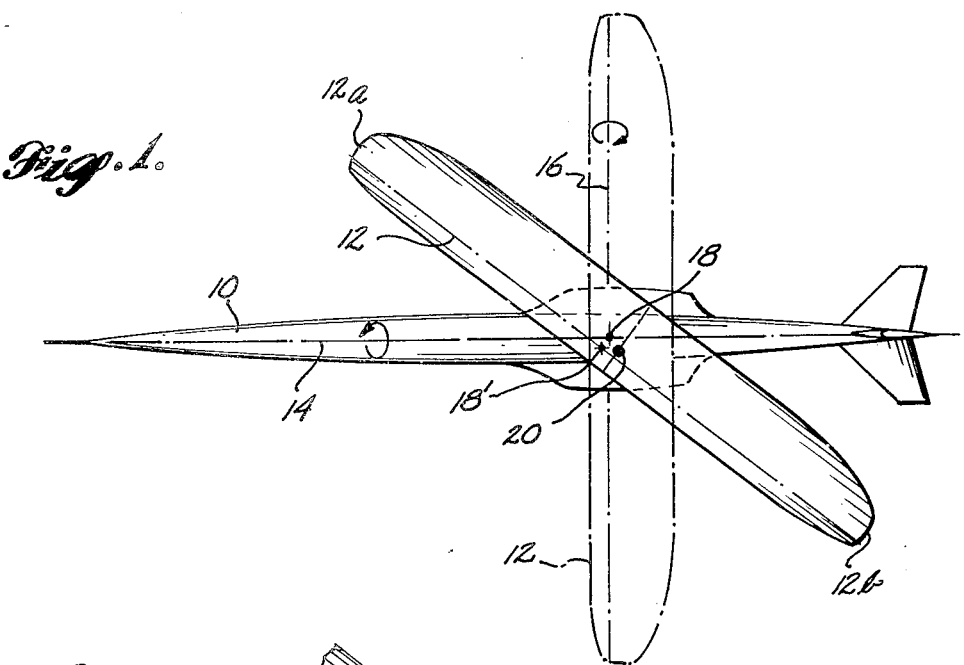
FIG. 1 is a simplified plan view of an oblique wing airplane employing the wing mounting means of the present invention.

In accordance with the present invention, the transonic airplane illustrated in FIG. 1 has a fuselage 10 and a wing 12 that can be oriented obliquely relative to the centerline 14 of the airplane fuselage so as to reduce drag at transonic flight speeds, and thus increase the lift to drag ratio of the overall airplane. Airplanes of this type are generally referred to as oblique-wing or yawed-wing airplanes. Although the oblique orientation of the wing 12 at transonic speeds is desirable, the low speed, subsonic flight characteristics of the airplane are not satisfactory for a transport airplane. Therefore, such airplanes are designed so that the wing 12 can be rotated relative to the fuselage about a generally vertical axis to orient the wing 12 so that its span is oriented orthogonally to the centerline of the fuselage. Thus a straight wing that has good low speed flight characteristics can be employed in a transonic airplane by merely rotating the wing to an oblique orientation relative to the fuselage as the airplane approaches transonic speeds.

However, as pointed out above, an oblique wing configuration induces both a pitch and roll moment in the airplane, due in part to the aeroelastic effect on the oblique wing. These induced moments will tend to cause the aircraft 10 to roll about its longitudinal centerline 14 toward the trailing tip 12b, that is, will cause the trailing tip 12b to rotate under the fuselage as the leading tip 12a rotates over the fuselage. At the same time, the aeroelastic effect on the oblique wing may cause a slight pitch moment to occur about the pitch axis of the airplane. However, this pitch moment may be partially offset or may be more than offset by the rearward shift of the center of pressure on the aircraft wing as the airplane transcends from subsonic flight speeds to supersonic flight speeds, since the rearward shift of the center of pressure on the wing causes a downward pitch moment about the pitch axis.

There are, of course, many other aerodynamic effects caused by fuselage shape, airfoil design, empennage design and other factors that will affect the pitch and roll moments of the aircraft. However, for purpose of the present invention, the discussion here will be limited to the pitch and roll moments induced by the aeroelastic effect on the oblique wing and by the center of pressure shift on the wing as the aircraft enters the transonic flight speed regime. In accordance with the present invention, these induced pitch and roll moments can be effectively counteracted by rotating the wng from its conventional position to its oblique position about a vertical axis that is offset from the mean aerodynamic center of lift of the wing when in its conventional position.

Figure 2:
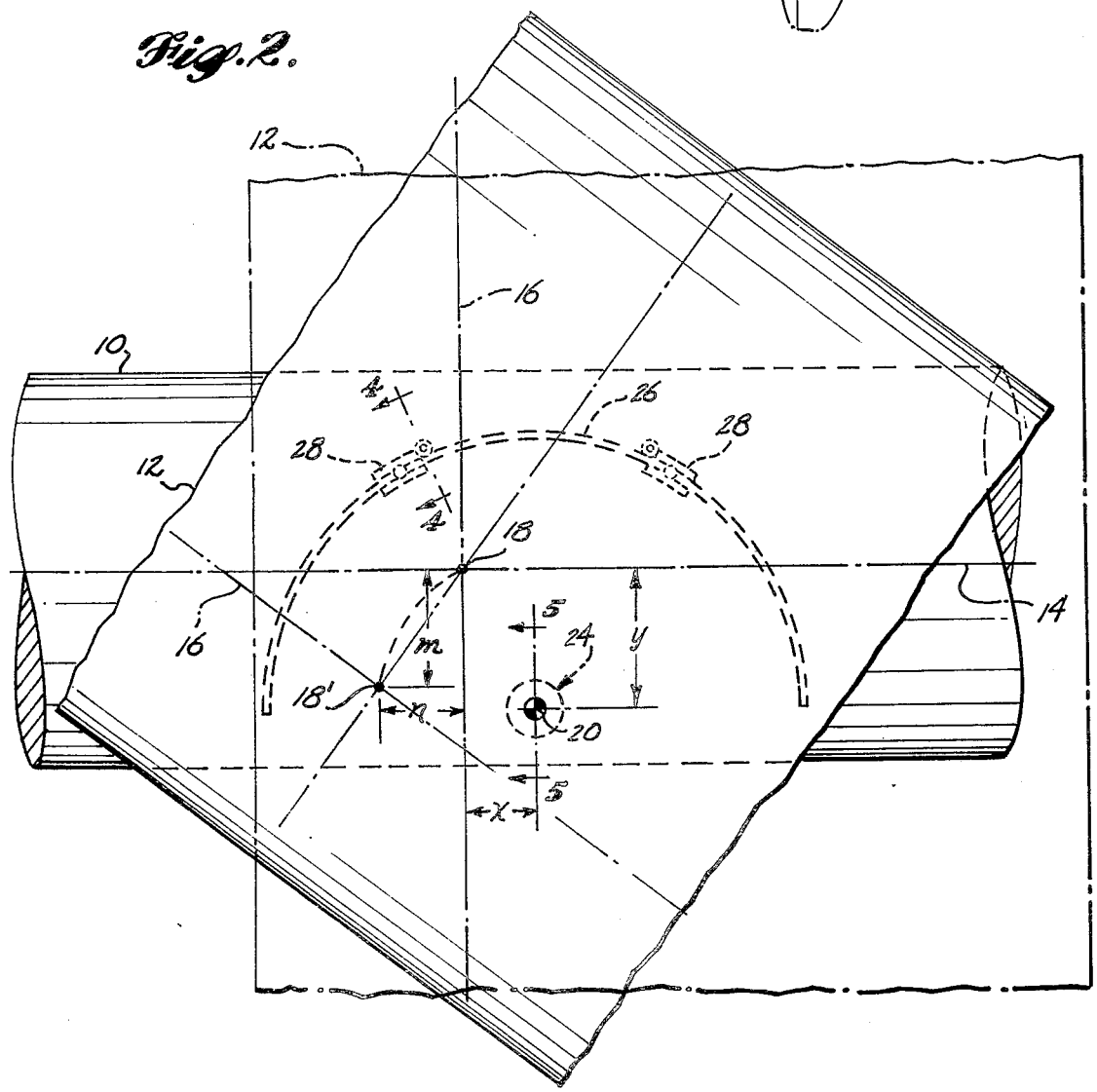
FIG. 2 is a simplified plan view of a segment of the wing and a segment of the fuselage of an oblique wing airplane showing the location of the mean aerodynamic center of lift and showing the location of the vertical wing pivot axis relative to the mean aerodynamic center of lift.

Referring to FIGS. 2 and 3, the wing 12 in its conventional position is shown in dot-dash outline relative to the fuselage 10 and is shown in solid outline in an oblique position relative to the fuselage 10. Limiting the aerodynamics discussion herein to the aeroelastic effect on the oblique wing and the center of pressure shift on the wing encountered at supersonic speeds for an idealized airplane, it will be assumed for purposes of discussion that the center of lift of the wing 12 and the center of gravity of the airplane both lie on a vertical axis 18 (FIG. 3), indicated by point 18 in FIG. 2. The vertical axis 18, for purposes of discussion, is also intersected by the centerline 14 of the airplane, the effective center of aerodynamic lift line 16, and the pitch axis of the airplane. The effective center of aerodynamic lift line 16 can be determined empirically for any given airfoil and can be approximated for most wings by equating it to the 25% mean aerodynamic chord line. The 25% mean aerodynamic chord line is found by first determining the mean aerodynamic chord of each of the left and right spans of the wing, then calculating the 25% chord point of the mean aerodynamic chord. The 25% mean aerodynamic chord line is then found by drawing a straight line between the 25% mean aerodynamic chord point on both the left and right spans. Where the 25% mean aerodynamic chord line intersects the root chord of the wing is also a good approximation of the center of lift of the wing. For purposes of this discussion, the 25% mean aerodynamic chord line will be equated with the effective center of aerodynamic lift line 16 (hereafter referred to as the center of lift line).

Referring specifically to FIG. 2, the present invention provides a means for compensating for: (1) the induced roll moment caused by the aeroelastic effect on the oblique wing; (2) the induced pitch moment caused by the aeroelastic effect on the oblique wing; and, (3) the induced pitch moment caused by the rearward center of pressure shift at supersonic flight speeds. In accordance with the invention, the center of aerodynamic lift of the wing is shifted transversely relative to the centerline of the airplane, and thus the roll axis, toward the trailing tip of the oblique wing as the wing is swung from its conventional position to its oblique position. The lateral shift of the center of lift from its conventional location 18 (FIG. 2) to its laterally offset, oblique location 18′, is accomplished by rearwardly offsetting the vertical axis 20 about which the wing pivots from the location of the center of lift 18 when the wing is in its conventional position. The lateral shift of the center of lift to its oblique position 18′ redistributes the lift of the wing relative to the fuselage to provide a roll moment in the opposite direction to the roll moment induced by the aeroelastic effect. Since the distance the vertical axis 20 is rearwardly offset from the center of lift 18 of the wing when in its conventional position will determine the amount of transverse movement of the center of lift to its oblique position 18′, the rearwardly offset position of the vertical axis 20 can be predetermined so that the lateral shift of the center of lift will create a roll moment that is substantially equal to the induced roll moment caused by the aeroelastic effect at cruise speeds, thus cancelling that induced roll moment.

For purposes of simplifying the discussion, it will be assumed that the pitch moment induced by the center of pressure shift is greater than the pitch moment caused by the aeroelastic effect, thus creating a net downward pitch tendency on the airplane. This pitch moment can be compensated for by shifting of the center of lift on the wing forwardly as it is swung from its conventional position to its oblique position. The center of lift is shifted forwardly by offsetting the vertical pivotal axis 20 of the wing transversely relative to the fuselage centerline 14, as shown in FIG. 2. Since the net pitching moment induced by the center of pressure shift is downward (that is, the nose of the airplane will tend to swing downwardly about the pitch axis of the airplane), shifting the center of lift of the wing forwardly will create an upward pitch moment to counteract the downward pitch moment induced by the center of pressure shift. Again, by properly choosing the distance by which the vertical axis 20 is laterally offset from the conventional location 18 of the center of lift, the forward shift of the center of lift as the wing is rotated to its oblique position can be predetermined so as to create an upward pitch moment that is substantially equal to, and thus cancels, the net downward pitch moment induced by the center of pressure shift.

Thus as shown in FIGS. 1, 2 and 3, the vertical axis 20 of the wing has been offset in accordance with the present invention rearwardly from the conventional location 18 of the center of lift and laterally from the fuselage centerline in the direction of the trailing tip of the wing 12. By offsetting the vertical axis 20 of the wing by a distance y and by offsetting the axis rearwardly by a distance x, the oblique position 18′ of the center of lift of the wing is shifted forwardly and transversely toward the trailing tip 12b from its conventional location 18 by a distance m and a distance n, respectively. Thus, when the wing is in its oblique position as shown in FIG. 2 with the center of lift offset forwardly and toward the trailing tip from its conventional location, the change in the lift distribution of the wing relative to the aerodynamic center of the aircraft will tend to counteract both the upward pitch moment induced by the center of pressure shift and the roll moment induced by the aeroelastic effect on the oblique wing. Based upon the foregoing description, one of ordinary skill will be able to locate the pivotal axis of the wing so as to shift the mean aerodynamic center of lift of the wing when in its oblique position to counteract the other aerodynamic forces acting on the airplane under a given set of flight conditions. One of ordinary skill will also realize that the present invention can be employed not only for counteracting the aerodynamic forces on the airplane caused by the oblique wing and the center of pressure shift, but also for other aerodynaimc characteristics of the airplane.

A simplified structure for offsetting the pivotal axis of the wing from the conventional position of the center of lift of the wing is illustrated in the remaining figures. Referring first to FIGS. 2 and 3, one such coupling means is schematically illustrated. The coupling means 10 comprises a vertical pivot member, generally designated 24, and a circular track 26 coupled to guide members 28. The vertical pivot member 24 includes a ball and socket joint 30 affixed to the wing and a universal joint 32 affixed to the airplane fuselage 10. A shaft 34 interconnects the ball and socket joint 30 and the universal joint 32. The circular track 26 is spaced from the vertical pivot member 24 and has its center of revolution coincident with the vertical axis 20 of the vertical pivot member 24. The track is affixed to the wing and extends downwardly from the wing toward the fuselage and is received in the guide member 28. It is to be understood that the entire interconnecting structure, including the vertical pivot member 24, the track 26 and the coupling member 28, in an actual airplane would be surrounded by an aerodynamic fairing 36, represented by dot-dash lines. The guide member 28 is affixed to and extends upwardly from the fuselage. Although two guide members 28 are shown in FIG. 2, more guide members can be used as desired or as necessary to rigidly interconnect the wing to the fuselage. One of ordinary skill will also realize that a single, elongated, arcuate guide member can also be employed in lieu of two or more spaced guide members.

Referring now to FIG. 4, track 26 and guide member 28 are illustrated in greatly enlarged cross-section to show how the guide member 28 is coupled to the circular track 26. The track 26 is affixed to wing structure and has a semi-circular web that extends downwardly from the wing. Transverse flanges 40 and 42 are located on the central portion of the downwardly extending track web and define upper and lower, track bearing surfaces. A segment of an external ring gear 46 is formed integrally on the outer surface of the semicircular, lower extension 44 of the track 26. The ring gear extends around the entire periphery of the semicircular extension and meshes with a drive pinion 48 rotatably mounted in the housing of the guide member 28. The guide member housing is arcuate in configuration and has a lower housing portion 38a affixed to and extending upwardly from the fuselage 10 and an upper housing portion 38b. The transverse flanges and the lower extension 44 of the track extend into an annular recess 54 in the lower housing portion 38a adjacent and extending upwardly from the location of the pinion 48. An enlarged annular channel 54 is located on top of and forms an upper extension of the lower portion of the annular channel in which the lower extension 44 is located. The enlarged annular recess 54 defines a lower bearing surface in the lower housing portion and an upper bearing surface in the upper segments 38b and 38c of the housing 38. The bearing surfaces in the housing cooperate with the bearing surfaces on the transverse track flanges 40 and 42 to form a bearing race for tapered bearings 56 which, when positioned in the race, mount the circular track for movement along a circular path through the housing 38. The two upper housing segments 38b and 38c also arcuate in configuration and are positioned on opposite sides of and spaced from the track 26. The upper housing segments 38b and 38c are also affixed to the lower housing portion 38a by conventional fastening means.

A drive shaft 50 extends from a prime mover mounted in the fuselage (not shown) upwardly through a bore 52 in the lower housing portion 38a of the guide member. The shaft 50, which is rotatably mounted in bearings 58, is fixed to the drive pinion 48. Upon rotation of the shaft 50, the pinion 48 meshes with the external ring gear segment 46 on the track to move the track 40 along a semicircular path relative to the lower housing portion 38a. Thus the track 26 is mounted so that it can rotate about the vertical axis 20 of the vertical pivot member 24 in response to rotation of the drive pinion 48. The track 26 and the guide member 28 cooperate to couple the wing 12 to the fuselage 10 and to transmit loads between the two in all directions except the tangential direction relative to the track. The wing 12 is fixed in the tangential direction by stopping the rotation of the pinion 48. Tangential loads on the track are thus transmitted through the external ring gear 46 to the pinion 48 and through the drive shaft 50 to the lower housing 38a through the drive shaft bearings 58. If desired the track can be clamped to lock the wing in its oblique or conventional position (by means not shown) to remove the load from the ring and pinion gears.

Referring now to FIG. 5, an enlarged schematic view in partial cross-section of the vertical pivot member 24 is illustrated. The ball and socket joint 30 comprises upper and lower housing sections 60 and 60a. Upper housing section 60 is affixed to the wing 12 and carries a hemispherical recess 62 into which the upper end of a ball 64 is seated. The lower housing segment 60a contains a complementary hemispherical recess 62a and is affixed to the upper housing section 60 by suitable fasteners to secure a ball 64 in position. The ball 64 is affixed to the vertically oriented shaft 34 extending downwardly through an opening 68 in the lower housing segment 60a. The lower end of the shaft 34 is coupled by a universal joint 70 to a fixed base member 72, in turn affixed to a lower portion of the universal joint housing 74. The universal joint is housed in a recess in the upper portion of the housing 74. The recess is covered by a cover plate 74a having an opening 76 in the upper portion thereof through which the shaft 34 extends.

The ball and socket joint provides three degrees of rotational freedom of movement for one end of the vertical rotational axis and provides through the universal joint two degrees of freedom of rotational movement. The universal joint provides freedom of rotational movement along two orthogonal, generally horizontal axes, while the ball and socket joint provides freedom of movement along the same axes and, in addition, around a rotational axis that is oriented vertically through the shaft 34. Thus the vertical pivot member 24 fixes the wing 12 to the fuselage 10 and transmits loads between the two in only the vertical direction, while allowing rotational movement and transverse movement relative to the shaft to provide for expansion and contraction of wing and fuselage structure as well as other dimensional changes that may occur while the wing and fuselage and under dynamic loading. If desired, a ball and socket joint or its equivalent can be substituted for the simple universal joint just described, also providing the bottom joint with three rotational degrees of freedom of movement.

As can be seen, the present invention fulfills the objects set forth at the beginning of the specification. That is, the offset pivot axis provided by the vertical pivot member allows the mean aerodynamic center of lift of the wing to be shifted from its conventional location substantially over the center of gravity of the airplane to a position rearwardly and transversely, if desired, from the center of gravity of the airplane as the wing is pivoted from its conventional position to its oblique position. The exact position to which the mean aerodynamic center of lift of the wing is shifted in accordance with the present invention will depend upon many factors, including the load distribution in the airplane during flight and the aerodynamic pressure distribution over the entire airplane. It is also to be understood that many alternate forms of coupling means other than those specifically disclosed can be employed to effect the broad concepts disclosed.

Thus the present invention has been disclosed in relation to a presently preferred embodiment of the invention. One of ordinary skill in the art will be able to effect various alterations, substitutions of equivalents and other changes to the embodiment just described without departing from the broad concepts disclosed herein. It is therefore intended that the protection granted by Letters Patent hereon be limited only by the definition contained in the appended claims and equivalents thereof.

What is claimed is:

1. In an airplane having a fuselage and a single, continuous wing, said wing being swingable from a conventional position wherein the span of the wing is oriented generally orthogonally to the fuselage centerline and an oblique position wherein said wing span is oriented at an oblique angle to said fuselage centerline, said wing having a leading tip and a trailing tip when in said oblique position, said wing and said fuselage cooperating to define a mean aerodynamic center of lift when said wing is in said conventional position, the improvement comprising:

means for coupling said wing to said fuselage for swinging movement between said conventional and oblique positions about a substantially vertical axis offset rearwardly from said mean aerodynamic center of lift when said wing is in said conventional position, said vertical axis being offset rearwardly to shift said center of lift laterally relative to said fuselage in the direction of said trailing tip as said wing is swung from said conventional position to said oblique position, thereby to counteract roll moments induced by the aeroelastic effect on said oblique wing.

2. In the airplane of claim 1 wherein said axis is offset transversely from said fuselage centerline to shift said center of lift longitudinally relative to said fuselage as said wing is swung from said conventional position to said oblique position, thereby to counteract pitch moments induced by the aeroelastic effect on said oblique wing and by shifts in the center of pressure due to speed changes of the aircraft.

3. In an aircraft having a fuselage and a single, continuous wing, said fuselage having a centerline, said wing having a span, said wing being pivotable between a conventional position wherein said span is oriented substantially orthogonally to said fuselage centerline and an oblique position wherein said span is oriented obliquely to said fuselage centerline, said wing having a leading tip and a trailing tip when in said oblique position, an improvement for mounting said wing on said fuselage comprising:

pivot means for pivotally mounting said wing to said fuselage for pivotal movement about a generally vertical axis, said vertical axis intersecting said wing at a location rearwardly from the mean aerodynamic center of lift of said wing when in said conventional position and transversely relative to said fuselage centerline from said mean aerodynamic center of lift when said wing is in said conventional position, said vertical axis being transversely offset from said mean aerodynamic center of lift in the direction away from the leading tip of said wing when in said oblique position, and guide means spaced from said pivot means and associated with said fuselage for connecting said wing for sliding movement relative to said fuselage, said pivot means and said guide means cooperating to provide at least two points of attachment between said wing and said fuselage.

4. The improvement of claim 3 wherein said pivot means is flexible in the direction parallel to the fuselage centerline and in the direction of said span and is capable of transmitting loads in a direction substantially parallel to said vertical axis.

5. The improvement of claim 3 wherein said guide means comprises:

a circular track mounted on one of said wing and said fuselage and at least one track guide member mounted on the other of said fuselage and said wing, said circular track having its center of revolution substantially coincident with said vertical axis.

6. The improvement of claim 5 wherein said circular track and said at least one track guide member cooperate to transmit loads between said wing and said fuselage in all directions except the direction tangential to said circular track.

7. In an aircraft having a fuselage and a wing, said fuselage having a centerline, said wing having a span, said wing being pivotable between a conventional position wherein said span is oriented substantially orthogonally to said fuselage centerline and an oblique position wherein said span is oriented obliquely to said fuselage centerline, an improvement for mounting said wing on said fuselage comprising:

pivot means for pivotally mounting said wing to said fuselage for pivotal movement about a generally vertical axis, said vertical axis intersecting said wing at a location rearwardly from the mean aerodynamic center of lift of said wing when in said conventional position and transversely relative to said fuselage centerline from said mean aerodynamic center of lift when said wing is in said conventional position, said vertical axis being transversely offset from said mean aerodynamic center of lift in the direction away from the leading tip of said wing when in said oblique position, said pivot means including a ball and socket coupling member, a universal coupling member, and a shaft interconnecting said universal coupling member and said ball and socket coupling member, one of said ball and socket coupling member and said universal coupling member being affixed to said fuselage and the other of said coupling members being affixed to said wing, said ball and socket coupling member being capable of rotational movement about said vertical axis and about a first set of two horizontal orthogonal axes, said universal coupling member being capable of rotational movement about a second set of two horizontal orthogonal axes, and guide means spaced from said pivot means and associated with said fuselage for connecting said wing for sliding movement relative to said fuselage, said pivot means and said guide means cooperating to provide at least two points of attachment between said wing and said fuselage.

* * * * *